(12) United States Patent
Webber

(10) Patent No.: US 10,847,063 B2
(45) Date of Patent: Nov. 24, 2020

(54) DUAL VEHICLE RIM WITH LOGO APPARATUS AND A METHOD OF MAKING SAME

(71) Applicant: Kimel Webber, Wallkill, NY (US)

(72) Inventor: Kimel Webber, Wallkill, NY (US)

( * ) Notice: Subject to any disclaimer, the term of this patent is extended or adjusted under 35 U.S.C. 154(b) by 0 days.

(21) Appl. No.: 16/785,557

(22) Filed: Feb. 7, 2020

(65) Prior Publication Data

US 2020/0226957 A1   Jul. 16, 2020

Related U.S. Application Data

(63) Continuation-in-part of application No. 15/727,594, filed on Oct. 7, 2017, now Pat. No. 10,647,151.

(51) Int. Cl.
G09F 7/16 (2006.01)
B60R 13/00 (2006.01)
B60B 3/00 (2006.01)

(52) U.S. Cl.
CPC ............ *G09F 7/165* (2013.01); *B60B 3/002* (2013.01); *B60R 13/005* (2013.01)

(58) Field of Classification Search
CPC ... B60B 3/002; B60B 7/008; B60B 2900/572; B21D 53/30
USPC .................................................. 301/63.101
See application file for complete search history.

(56) References Cited

U.S. PATENT DOCUMENTS

| | | | |
|---|---|---|---|
| 5,316,376 A | 5/1994 | Defreitas | |
| 5,464,276 A | 11/1995 | Ott | |
| 7,562,939 B2 | 7/2009 | Zanin | |
| 2005/0206219 A1 | 9/2005 | Johnson | |
| 2010/0038957 A1* | 2/2010 | Henline | B60B 25/008 301/37.28 |
| 2011/0309670 A1* | 12/2011 | Taylor | B60B 3/10 301/64.101 |
| 2013/0033095 A1* | 2/2013 | Vargas | B60B 21/125 301/64.305 |
| 2014/0152078 A1 | 6/2014 | Noriega | |
| 2014/0292062 A1* | 10/2014 | Luzanilla | B60B 3/002 301/64.101 |
| 2015/0224819 A1* | 8/2015 | Huusmann | B60B 7/00 301/37.34 |
| 2015/0246578 A1* | 9/2015 | Ofisher | B60B 21/102 301/11.2 |

(Continued)

*Primary Examiner* — S. Joseph Morano
*Assistant Examiner* — Jean W Charleston
(74) *Attorney, Agent, or Firm* — Aziz M. Ahsan; Ahsan & Assocites, PLLC

(57) ABSTRACT

The invention relates generally to the field of vehicle rims, and more specifically to Logo Rims or Dual Logo Rims. The invention also relates to a vehicle Dual or Logo Rim apparatus, and a method of making same. More particularly, the invention encompasses a customized tire rim for a vehicle. The invention also provides a user to replace their existing tire rims with the inventive customized vehicle rim having, and using a customized or a personalized logo. A line of specially designed tire rims that are adorned with a variety of striking designs, sporting logos germane to sports, businesses, and popular culture, is also disclosed. The invention also provides an inventive design which is intended to provide automobile enthusiasts with an attractive alternative to ordinary tire rims. The inventive rims can be a single unit rim or two separate rims that are joined to form a single tire rim.

20 Claims, 7 Drawing Sheets

(56) References Cited

U.S. PATENT DOCUMENTS

2015/0283853 A1\* 10/2015 Wang ..................... B60B 3/001
301/95.11

\* cited by examiner

DUAL VEHICLE RIM WITH LOGO APPARATUS AND A METHOD OF MAKING SAME

CROSS-REFERENCE ITO RELATED APPLICATION

The instant patent application is a Continuation-In-Part of U.S. patent application Ser. No. 15/727,594, filed on Oct. 7, 2017, titled "VEHICLE LOGO-RIM APPARATUS AND A METHOD OF MAKING SAME" which issued as U.S. Pat. No. 10,647,151, on May 12, 2020, and the entire disclosure of pending patent application is incorporated herein by reference.

FIELD OF THE INVENTION

The invention relates generally to the field of vehicle rims, and more specifically to Logo Rims or Dual Logo Rims. The invention also relates to a vehicle Dual or Logo Rim apparatus, and a method of making same. More particularly, the invention encompasses a customized tire rim for a vehicle. The invention also provides a user to replace their existing tire rims with the inventive customized vehicle rim having, and using a customized or a personalized logo. A line of specially designed tire rims that are adorned with a variety of striking designs, sporting logos germane to sports, businesses, and popular culture, is also disclosed. The invention also provides an inventive design which is intended to provide automobile enthusiasts with an attractive alternative to ordinary tire rims. The inventive rims can be a single unit rim or two separate rims that are joined to form a single tire rim.

BACKGROUND INFORMATION

Vehicle rims have been used in the automotive industry for its inception and these rims on which a tire is mounted come in many round shapes, widths, radial sizes, and other physical features and attributes. These vehicle tire rims are mostly made of a metal or a metal alloy, and on which a vehicle tire is mounted.

Many individuals drive vehicles to and from work and for pleasure. Many individuals like to fix their "ride" to match their personal taste(s). Whether by ordering personalized license plates, attaching fancy mud flaps to the rear tires, installing floating neon lights along the car's undercarriage or airbrushing elaborate designs upon the car's hood and trunk, customizing one's vehicle is truly an exciting and artistic way in which to express oneself. An extremely popular way in which people revamp the overall appearance of their cars, trucks, and vans, is by installing a new set of tires. Many times the OEM rims on which the tires are mounted may not suit the rest of the vehicle. Many consumers do not find individuality in OEM rims and as such desire an alternative option.

Various attempts have been made to solve problems found in the rim art, and following prior art is representative of some of the current innovations in the vehicle rim art.

U.S. Pat. No. 5,316,376 (Manuel P. Defreitas), the entire disclosure of which is incorporated herein by reference, discloses a vehicle wheel cover adapted to clip on to a wheel rim wherein the wheel cover includes as an element thereof a disc, bearing decorative indicia, which may include a mounted photograph or artwork, and a superposed convex lens to magnify such indicia when viewed from a position exterior of the vehicle to which it may be attached.

U.S. Pat. No. 5,464,276 (Roderick L. Ott), the entire disclosure of which is incorporated herein by reference, discloses a wheel cover assembly for attachment to a vehicle wheel including a rim and a rim center includes a cover plate and securement mechanisms for securing the cover plate over the wheel rim. The cover plate includes opposite inner and outer faces, and the outer face bears indicia which may personalize the vehicle with which the cover assembly is utilized. In addition, the cover plate is positionable adjacent the rim of a vehicle wheel so that when the plate is positioned adjacent the rim, the inner face of the plate faces the rim. The securement mechanisms include tension members which are connectable to the vehicle wheel rim and which span at least a fraction of the rim when connected thereto. Moreover, the tension members have legs whose lengths are adjustable to accommodate the attachment of the securement means to wheel rims at locations thereon wherein the distance that the attachment locations of one of such wheel rims is spaced from its corresponding rim center is different from the distance that the attachment locations of the other of such wheel rims is spaced from its corresponding wheel center.

U.S. Pat. No. 7,562,939 (Andrea Zanin), the entire disclosure of which is incorporated herein by reference, discloses a motor vehicle wheel, comprising a structural body formed by an outer rim with which the tire is to be associated, by a hub and by at least one spoke for connecting the rim to the hub; the structural body is made of steel. The wheel advantageously comprises a wheel cover for covering the exposed parts of the structural body which is made of metallic light alloy. The wheel cover is fixed to the structural body by way of elements for mechanical interconnection of the type which can be removed at least from the wheel cover. The wheel cover is provided with receptacles for the insertion of the bolts for fixing the rim to the axle of the motor vehicle. The mechanical interconnection elements are separate from the bolts for fixing the wheel to the axle of the motor vehicle.

U.S. Patent Publication No. 2005/0206219 (Peter J. Johnson), the entire disclosure of which is incorporated herein by reference, discloses a wheel for an automotive vehicle that has a hub for mounting to an axle of the automotive vehicle. A rim is disposed radially outward from the hub and being configured for receiving a tire. A support structure extends between the hub and the rim. The hub, rim and support structure each have an outer face. The outer face of at least one of the hub, rim and support structure has formed thereon monetary indicia.

U.S. Patent Publication No. 2014/0152078 (Frank Thomas Noriega), the entire disclosure of which is incorporated herein by reference, discloses a deep-lip wheel cover apparatus that attaches with a steel wheel includes a wheel cover, a center cap, and a hub ring. The hub ring is centrally connected with the steel wheel so that the wheel cover and the center cap can be attached to the hub ring. The wheel cover also attaches with the steel wheel through a plurality of fastening systems, where the plurality of fastening system provide additional connection points in between the wheel cover and the steel wheel. When the wheel cover and the center cap are installed within the steel wheel, the wheel cover and the center cap completely cover the steel wheel creating a deep-lip appearance within the steel wheel.

U.S. Patent Publication No. 2014/0292062 (Ruben Luzanilla, et al.), the entire disclosure of which is incorporated herein by reference, discloses a specially designed tire or wheel-rims that are adorned with the logos of professional and college athletic teams. In one embodiment, rims according to the present disclosure provide automobile enthusiasts and sport aficionados a unique means of celebrating a favorite sports team, while adding a dazzling personal touch to ordinary tires and rims. The features of the preferred embodiments which are believed to be novel are particularly pointed out and distinctly claimed in the concluding portion of the specification.

None of the above inventions and patents, taken either singly or in combination, is seen to describe the invention as claimed. Thus, a need exists for a reliable Dual Rim or Dual Logo-Rim to avoid the above-mentioned problems.

Additionally, in view of the foregoing disadvantages inherent in the known tire rim art, the present invention provides a novel Dual Rim or Dual Logo-Rim. The general purpose of the present invention, which will be described subsequently in greater detail, is to provide a line of specially designed vehicle tire rim that are adorned with a variety of striking designs, sporting logos germane to sports, businesses, and popular culture. The design intent is to provide automobile enthusiasts with an attractive alternative to ordinary tire rims. The features of the invention which are believed to be novel are particularly pointed out and distinctly claimed in the concluding portion of the specification. These and other features, aspects, and advantages of the present invention will become better understood with reference to the ensuing drawings and detailed description.

Furthermore, this invention improves on the deficiencies of the prior art and provides an inventive vehicle Dual Rim or Dual Logo-Rim apparatus, and a method of making same.

PURPOSES AND SUMMARY OF THE INVENTION

The invention is a novel vehicle Dual Rim or Dual Logo-Rim apparatus, and a method of making same.

One purpose of this invention is to provide a dual rim or dual logo-rim comprising a first rim, and a second rim, and wherein the first rim, and the second rim are joined along peripheral edges to form an inventive tire rim.

Yet another purpose of this invention is to provide a tire rim that has at least one customized or personalized feature.

Still yet another purpose of this invention is to provide a customized or personalized tire rim that can easily replace any other tire rim.

Yet another purpose of this invention is to provide a customized or personalized tire rim that has at least one logo plug to cover a vehicle hub, and to provide continuity to the customized or personalized logo.

Therefore, in one aspect this invention comprises an inventive rim for an automotive vehicle, comprising:
(a) a first rim having an outer wall at one end and a first mini-rim at an opposite end, and wherein said outer wall has a first rim bead, and said first mini-rim has a plurality of first holes along a peripheral wall surface;
(b) a second rim having an outer wall at one end and a second mini-rim at an opposite end, wherein said outer wall has a second rim bead, and said second mini-rim has a plurality of second holes along a peripheral wall surface;
(c) wherein said first rim is secured to said second rim by aligning at least one first hole of said first mini-rim with a corresponding second hole in said second mini-rim, and securing said first mini-rim to said second mini-rim using at least one first securing means, and forming a tire rim; and
(d) wherein said tire rim being configured for receiving a tire on its peripheral external radial wall surface between said first rim bead and said second rim bead, such that a first tire bead is in physical contact with said first rim bead, and a second tire bead is in physical contact with said second rim bead.

In another aspect this invention comprises an inventive rim for an automotive vehicle, comprising:
(a) a first rim having an outer wall at a first end, and an inner wall at a second end, said outer wall having an outer rim bead projecting substantially in an outwardly direction, said inner wall having an inner rim bead projecting substantially in an outwardly direction, said inner wall having a mini-rim projecting substantially in an inward direction, and wherein said mini-rim has a plurality of first holes along a peripheral inner wall surface;
(b) a second rim having an outer wall, and in inner wall, and a plurality of second holes along a peripheral wall surface;
(c) wherein said first rim is secured to said second rim by aligning at least one first hole of said mini-rim with a corresponding second hole in said second rim, and securing said mini-rim to said second rim using at least one first securing means, and forming a tire rim; and
(d) wherein said tire rim being configured for receiving a tire on its peripheral external radial wall surface between said first rim bead, and said second rim bead, such that a first tire bead is in physical contact with said first rim bead, and a second tire bead is in physical contact with said second rim bead.

In yet another aspect this invention comprises an inventive rim for an automotive vehicle, comprising:
(a) a first rim having an outer wall at one end and a first mini-rim at an opposite end, and wherein said outer wall has a first rim bead, and said first mini-rim has a plurality of first holes along a peripheral wall surface, and said first rim having a central opening for mounting to an axle of an automotive vehicle via a wheel hub;
(b) a second rim having an outer wall at one end and a second mini-rim at an opposite end, wherein said outer wall has a second rim bead, and said second mini-rim has a plurality of second holes along a peripheral wall surface, and said second rim having a central opening for mounting to an axle of an automotive vehicle via a wheel hub;
(c) wherein said first rim is secured to said second rim by aligning at least one first hole of said first mini-rim with a corresponding second hole in said second mini-rim, and securing said first mini-rim to said second mini-rim using at least one first securing means, and forming a tire rim;
(d) wherein said tire rim being configured for receiving a tire on its peripheral external radial wall surface between said first rim bead and said second rim bead, such that a first tire bead is in physical contact with said first rim bead, and a second tire bead is in physical contact with said second rim bead; and
(e) at least one support structure secured to said tire rim using at least one second securing means, and wherein said second securing means is secured to said second hole of said second mini-rim, and wherein said at least one support structure is secured to said tire rim at at least two different locations, and wherein said at least one support structure is at least one logo.

BRIEF DESCRIPTION OF THE DRAWINGS

The invention may best be further understood by reference to the ensuing detailed description in conjunction with the drawings in which.

DETAILED DESCRIPTION

Figure 1A:
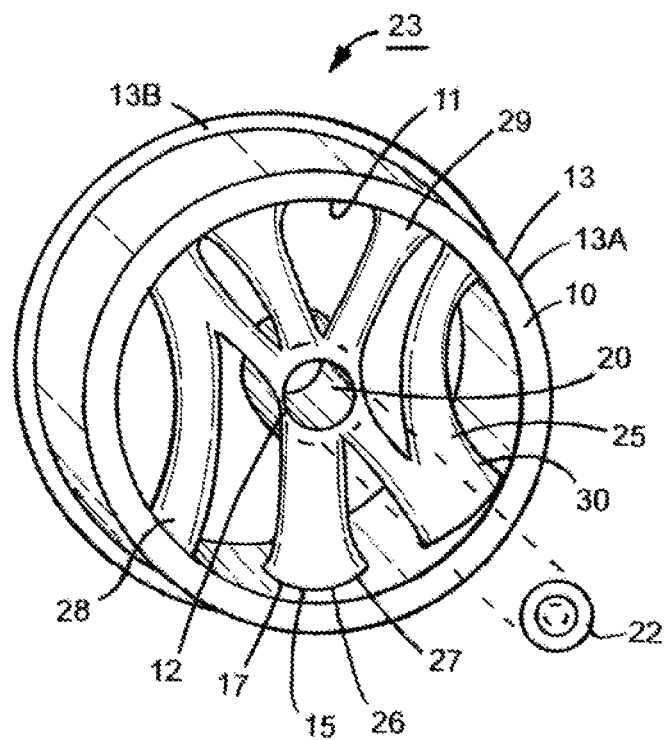
FIG. 1A, illustrates a perspective view of an inventive Logo Rim, according to a first embodiment of the invention.

The inventive vehicle Dual Rim or Dual Logo-Rim apparatus, and a method of making same will now be discussed with reference to FIG. 1A, through FIG. 10. Although the scope of the present invention is much broader than any particular embodiment, a detailed description of the preferred embodiment follows together with drawings. These drawings are for illustration purposes only and are not drawn to scale. Like numbers represent like features and components in the drawings.

Additionally, the embodiments of the present invention relate to a rim device and more particularly to a Dual Rim or Dual Logo-Rim that as used to provide automobile enthusiasts with an attractive alternative to ordinary tire rims.

Referring now to the drawings FIG. 1A to FIG. 10, Dual Rims or Dual Logo-Rims comprise a line of tire rims which feature a variety of dazzling designs that pay homage to sports, business, and popular culture logos. Preferably manufactured of polished chrome, aluminum, gold-plated, silver-plated, material, the Dual Rims or Dual Logo-Rims may be similar in structure to a standard set of tire rims and may be manufactured in sizes appropriate for various styles and sizes of popular tires, such as, for example, 18 inches, 20 inches, 22 inches, 24 inches, to name a few. Yet, the most notable feature of the Dual Rims or Dual Logo-Rims is found in the aforementioned stylish rim designs. These may include, but are not limited to, renderings associated with sporting organizations, such as, for example, the New York Jets, the New York Yankees, business monikers, such as, germane to such powerhouses as Sean John, Ford, fun symbols of popular culture, such as, the iconic "S" within a triangle for Superman, to name a few. As can be imagined, the possibilities for logo-centric designs are virtually limitless. To accommodate vehicles, the Dual Rims or Dual Logo-Rims may be marketed and sold, as individuals, a pair, or in sets of four.

There are many benefits and advantages associated with the Dual Rims or Dual Logo-Rims. Foremost, this invention turns an ordinary automobile into a dazzling showpiece. Providing automobile enthusiasts with a striking and attractive means of improving the appearance of their car. The inventive Dual Rims or Dual Logo-Rims also offer a car lover a unique means in which to transform the look of their "ride". Auto lovers who collect vintage classics or who enjoy restoring newer cars may especially appreciate these striking rim designs. Another advantage is that the Dual Rims or Dual Logo-Rims provide the car lover a creative means of customizing their automobile to express their very own style and suit their individual personality. Featuring a variety of striking designs, use of the Dual Rims or Dual Logo-Rims also provides a classy way in which to state, "I have arrived."

Consumers should appreciate that they would be able to choose from a vast array of striking designs to create a truly unique set of flashy tires. Fully functional, tires would run smoothly and efficiently on the Dual Rims or Dual Logo-Rims. The Dual Rims or Dual Logo-Rims offer the car enthusiasts a unique means of turning standard tires into attractive and fancy pieces of art. The inventive Dual Rims or Dual Logo-Rims are very easy to install, and these unique tire rims may almost instantly transform the appearance of any car or truck or vehicle.

The embodiments of the invention described herein are exemplary and numerous modifications, variations and rearrangements can be readily envisioned to achieve substantially equivalent results, all of which are intended to be embraced within the spirit and scope of the invention. Further, the purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

FIG. 1A, illustrates a perspective view of an inventive Dual Rim 23, or Dual Logo-Rim 23, according to a first embodiment of the invention. The Logo Rim 23, comprises of a vehicle rim 10, having an outer rim wall or surface or peripheral external radial surface 13, and an inner rim wall or surface or peripheral internal radial surface 11. For most applications the outer rim wall or surface 13, has an outer rim bead or lip 13A, and an inner rim bead or lip 13B. The outer rim bead 13A, and the inner rim bead 13B, are preferably used to centrally and securely hold the outer peripheral edge 100A, and inner peripheral edge 100B, of a vehicle tire 100, respectively, as more clearly shown in FIG. 3. The inner rim wall or surface 11, has at least two separate rim mating locations 17, to which a corresponding logo outer peripheral edges 15, of a logo 25, or a logo structure 25, are separately secured via at least one securing means 26. The logo structure 25, having at least one logo outer peripheral edge 15, having at least one logo mating location 27, and which peripheral edge 15, are separately secured to the at least two mating locations 17, via the logo mating location 27, using the at least one securing means 26. It is preferred that for most applications the logo 25, is completely secured inside the inner peripheral edges of the vehicle rim 10, and within the inner peripheral rim wall or surface 11, so that the logo 25, does not interfere with the performance of the vehicle to which the Logo Rim 23, is secure to. The logo 25, or the Logo Rim 23, has at least one central opening 20, having an internal wall or surface 12, for the passage of a vehicle wheel hub 75, as more clearly shown in FIG. 3. Optionally, a logo plug 22, could also be used to plug the at least one opening 20. For some applications the logo plug 22, could be slideably, and securely inserted into the at least one opening 20, so as to cover or plug the at least one opening 20. As shown in FIG. 1A, the logo 25, or the Logo Rim 23, comprises of an initial "N" 28, and initial "Y" 29, which could also be an initial or logo of an entity or organization 30, such as, for example, a sports team 30, such as, New York Yankees 30. It should be appreciated that for the ease of understanding the wheel studs 67, which slideably and securely engages with the Logo Rim 23, are more clearly being discussed in FIG. 3.

Figure 1B:
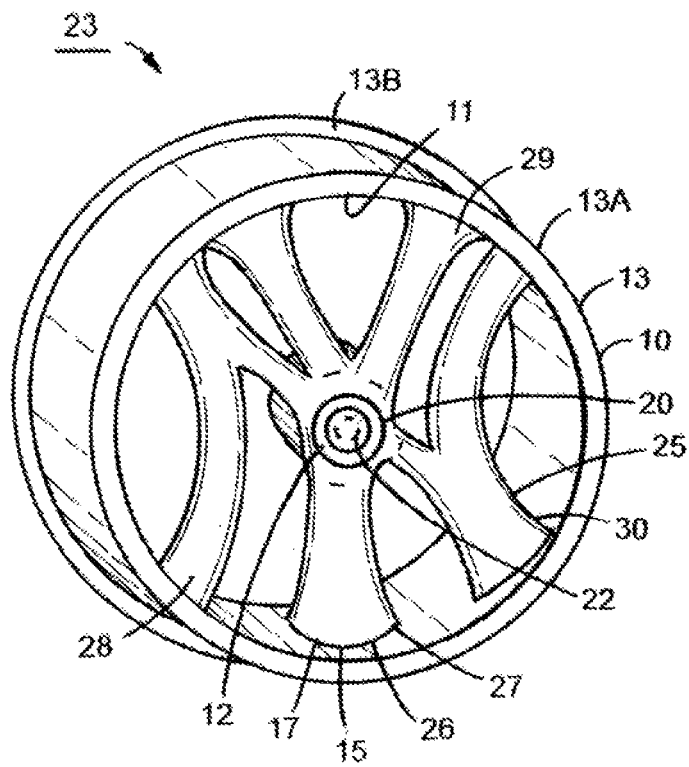
FIG. 1B, illustrates a perspective view of the inventive Logo Rim, of FIG. 1A, with the inventive Logo Plug installed.

FIG. 1B, illustrates a perspective view of the inventive Dual Rim 23, or Dual Logo-Rim 23, of FIG. 1A, with the inventive Logo plug 22, which has been installed, and is being used to cover or plug the hole or opening 20, and the internal wall or surface 12. The optional logo plug 22, could be used to plug the at least one opening 20, so as to provide continuity to the logo 25, 30, or to supplement the image of the logo 25, 30, or to compliment the image of the logo 25, 30. As one can clearly see in FIG. 1B, that the logo structure 25, having the logo mating location 27, has been securely, and permanently secured or mated or welded to the rim mating location 17, via at least one securing means 26, such as, a weld 26, at several locations.

Figure 2A:
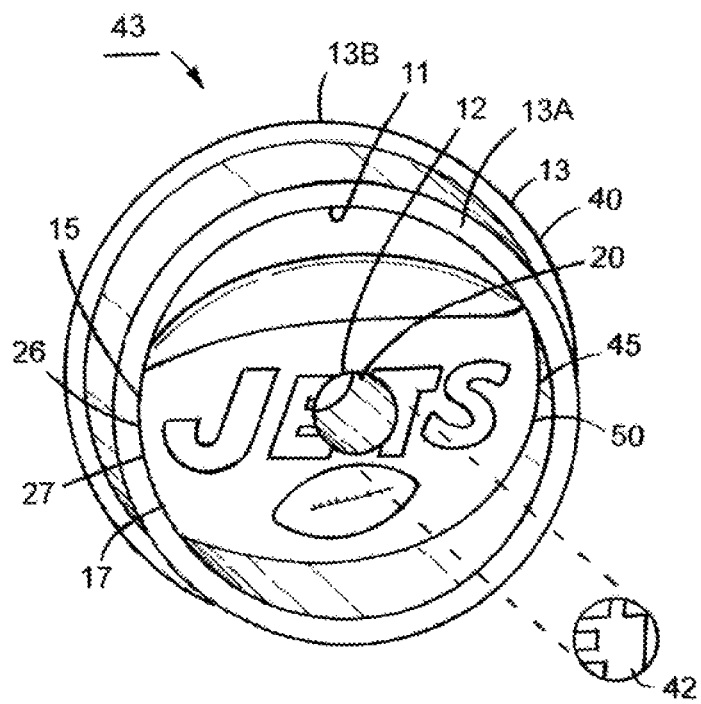
FIG. 2A, illustrates a perspective view of an inventive Logo Rim, according to a second embodiment of the invention.

FIG. 2A, illustrates a perspective view of an inventive Dual Rim 43, or Dual Logo-Rim 43, according to a second embodiment of the invention. The Logo Rim 43, comprises of a vehicle rim 40, having an outer rim wall or surface or peripheral external radial surface 13, and an inner rim wall or surface or peripheral internal radial surface 1. For most applications the outer rim wall or surface 13, has an outer rim bead 13A, and an inner rim bead 13B. The outer rim bead 13A, and the inner rim bead 13B, are preferably used to centrally and securely hold the outer peripheral edge 100A, and inner peripheral edge 100B, of a vehicle tire 100, respectively, as more clearly shown in FIG. 3. The inner rim wall or surface 11, has at least two separate rim mating locations 17, to which a corresponding logo outer peripheral edges 15, of a logo 45, or logo structure 45, is secured via at least one securing means 26. The logo structure 45, having at least one logo outer peripheral edge 15, having at least one mating location 27, and which peripheral edge 15, are separately secured to the at least two mating locations 17, via the logo mating location 27, using the at least one securing means 26. It is preferred that for most applications the logo 45, is completely secured inside the inner peripheral edges of the vehicle rim 40, and within the inner peripheral rim wall or surface 11, so that the logo 45, does not interfere with the performance of the vehicle to which the Logo Rim 43, is secure to. The logo 45, or the Logo Rim 43, has at least one central opening 20, having an internal wall or surface 12, for the passage of a vehicle wheel hub 75, as more clearly shown in FIG. 3. Optionally, a logo plug 42, could also be used to plug the at least one opening 20. For some applications the logo plug 42, could be slideably, and securely inserted into the at least one opening 20, so as to cover or plug the at least one opening 20. As shown in FIG. 2A, the logo 45, or logo structure 45, comprises of a logo 45, or a slogan 45, or a phrase 45, or a team indicator 45, such as, for example, the New York Jets 50.

Figure 2B:
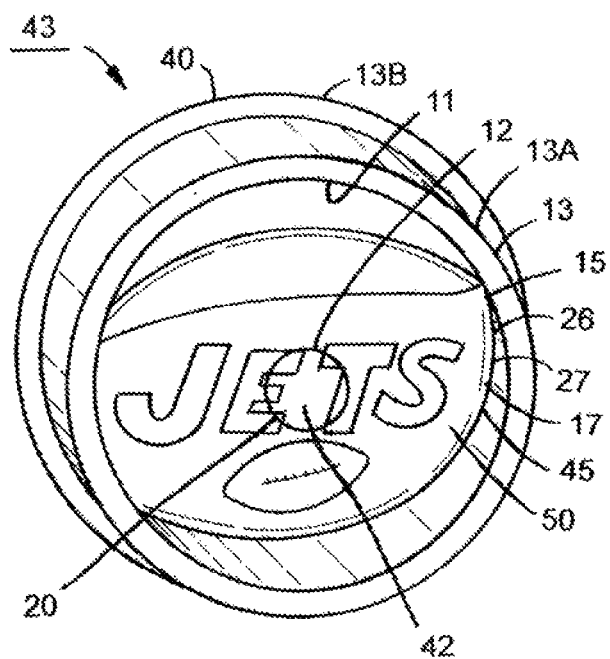
FIG. 2B, illustrates a perspective view of the inventive Logo Rim, of FIG. 2A, with the inventive Logo Plug installed.

FIG. 2B, illustrates a perspective view of the inventive Dual Rim 43, or Dual Logo-Rim 43, of FIG. 2A, with the inventive Logo plug 42, which has been installed, and is being used to cover or plug the hole or opening 20, and the internal wall or surface 12. The optional logo plug 42, could be used to plug the at least one opening 20, so as to provide continuity to the logo 45, 50, or to supplement the image of the logo 45, 50, or to compliment the image of the logo 45, 50. As one can clearly see in FIG. 2B, that the logo structure 45, having the logo mating location 27, has been securely, and permanently secured or mated or welded to the rim mating location 17, via at least one securing means 26, such as, a weld 26, at several locations, but at at least two locations at each end of the logo structure 45.

Figure 3:
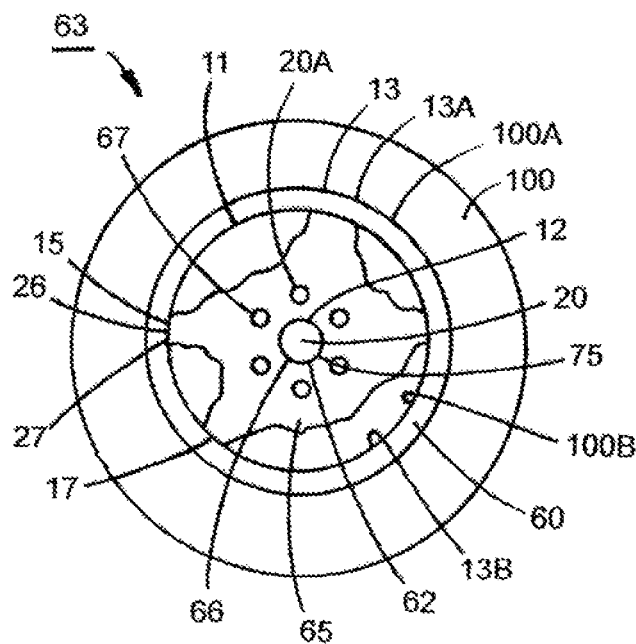
FIG. 3, illustrates a side view of an inventive Logo Rim, according to a third embodiment of the invention.

FIG. 3, illustrates a side view of an inventive Dual Rim 63, or Dual Logo-Rim 63, according to a third embodiment of the invention. The Logo Rim 63, comprises of a vehicle rim 60, having an outer rim wall or surface or peripheral external radial surface 13, and an inner rim wall or surface or peripheral internal radial surface 11. For most applications the outer rim wall or surface 13, has an outer rim bead 13A, and an inner rim bead 13B. The outer rim bead 13A, and the inner rim bead 13B, are preferably used to centrally and securely hold the outer peripheral edge 100A, and inner peripheral edge 100B, of a vehicle tire 100, respectively. The inner rim wall or surface 11, has at least two rim mating locations 17, to which a logo 65, or logo structure 65, is secured via at least one securing means 26. It is preferred that the logo 65, has at least one logo outer peripheral edge 15, having at least one logo mating location 27, and which peripheral edge 15, is secured to the at least two mating locations 17, via the logo mating location 27, using the at least one securing means 26. It is preferred that for most applications the logo 65, is completely secured inside the inner peripheral edges of the vehicle rim 60, and within the inner peripheral rim wall or surface 11, so that the logo 65, does not interfere with the performance of the vehicle to which the Logo Rim 63, is secure to. The logo 65, or the Logo Rim 63, has at least one central opening 20, having an internal wall or surface 12, for the passage of a vehicle wheel hub 75, and which could optionally be covered by at least one logo plug 62, and/or secured by at least one securing means 66. It should be understood that vehicle wheel hub 75, would slideably and engageably engage with the inside surface of the Logo Rim 23, 43, 63. Additionally, the Logo Rim 23, 43, 63, will have a plurality of wheel stud openings 20A, to slideably and engageably engage with a wheel stud 67. As shown in FIG. 3, the logo 65, comprises of an artistic rendition 65, or a scenery 65, or an abstract feature 65, and combinations thereof, to name a few.

For some applications, as shown in FIG. 3, an optional logo plug 22, 42, 62, could also be used to plug the at least one opening 20, and the internal wall or surface 12, and/or cover the vehicle wheel hub 75. It should be appreciated that the at least one logo plug 22, 42, 62, slideably and engageably covers the wheel hub 75, and the opening 20. For some applications the at least one logo plug 22, 42, 62, could also be used to cover the at least one opening for the wheel studs 20A, and/or the at least one wheel stud 67. For some applications one could also use at least one securing means 66, to secure the at least one logo plug 22, 42, 62, to the logo 25, 45, 65. The at least one securing means 66, could be selected from a group comprising, a screw means 66, a nut and bolt means 66, a tongue and groove means 66, and combinations thereof, to name a few.

Figure 4:
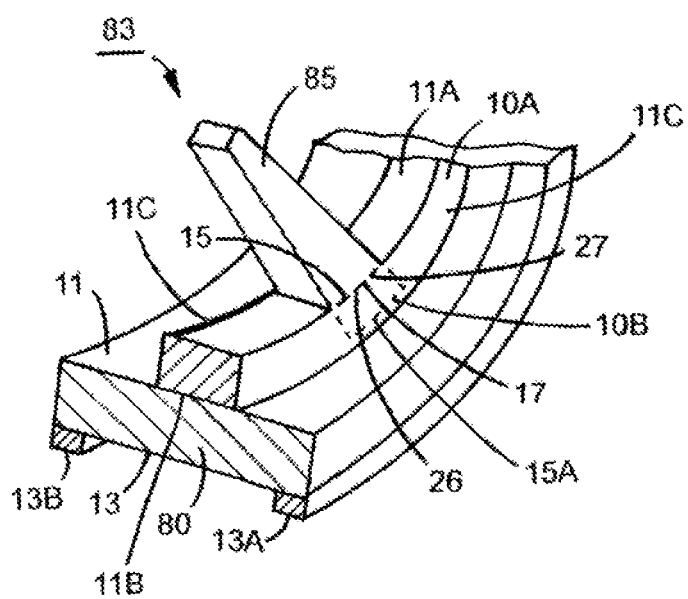
FIG. 4, illustrates a partial perspective view of an inventive Logo Rim, according to a fourth embodiment of the invention.

FIG. 4, illustrates a partial perspective view of an inventive Dual Rim 83, or Dual Logo-Rim 83, according to a fourth embodiment of the invention. The Logo Rim 83, comprises of a vehicle tire rim 80, having an outer rim wall or surface or peripheral external radial surface 13, and an inner rim wall or surface or peripheral internal radial surface 11, and optionally further having at least one internal radial mini-rim ring OA, having a mini-rim outer wall or surface or peripheral external radial surface 11A, and a mini-rim inner wall or surface or peripheral internal radial surface 11B, and a mini-rim side wall or surface or peripheral radial side surface 11C. The mini-rim inner wall 11B, would be secured to or integrated into the inner rim wall 11. However, for some applications the mini-rim inner wall 11B, could be a part of or an extension of the inner rim wall 11, and thus creating the mini-rim ring 10A. It should be appreciated that the at least one mini-rim ring 10A, provides additional structure and safety to the vehicle tire rim 80. Thus, for most applications, it is preferred that the at least one mini-rim-ring 10A, is secured or placed in the central portion of the peripheral internal radial surface 11, of the vehicle tire rim 80. It should be understood that the logo outer peripheral edge 15, of a logo 85, would be mated with or secured to the mating location 27, of the at least one mini-rim ring 10A, using at least one securing means 26. For most applications the outer rim wall or surface 13, has an outer rim bead 13A, and an inner rim bead 13B. The outer rim bead 13A, and the inner rim bead 13B, are preferably used to centrally and securely hold the outer peripheral edge 100A, and inner peripheral edge 100B, of a vehicle tire 100, respectively, as more clearly shown in FIG. 3. The inner rim wall or surface 11, has at least two rim mating locations 17, to which a logo 85, or logo structure 85, is secured via at least one securing means 26. It is preferred that the logo 85, has at least one logo outer peripheral edge 15, having at least one logo mating location 27, and which peripheral edge 15, is secured to the at least two mating locations 17, via the logo mating location 27, using the at least one securing means 26. It is preferred that for most applications the logo 85, is completely secured inside the inner peripheral edges of the vehicle rim 80, and within the inner peripheral rim wall or surface 11, so that the logo 85, does not interfere with the performance of the vehicle to which the Logo Rim 83, is secure to. The logo 85, or the Logo Rim 83, has at least one central opening 20, having an internal wall or surface 12, for the passage of a vehicle wheel hub 75. It should be understood that vehicle wheel hub 75, would slideably and engageably engage with the inside surface of the Logo Rim 23, 43, 63, 83. Additionally, the Logo Rim 23, 43, 63, 83, will have a plurality of wheel stud openings 20A, to slideably and engageably engage with a wheel stud 67, as more clearly shown in FIG. 3.

Figure 5:
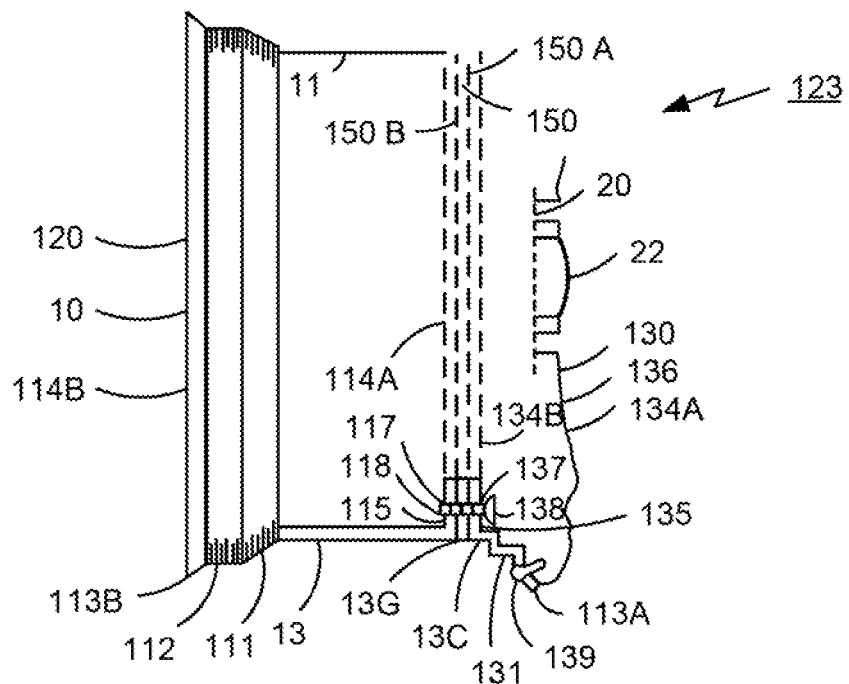
FIG. 5, illustrates a partial side cut-away view of an inventive Dual Rim, according to a fifth embodiment of the invention.

FIG. 5, illustrates a partial side cut-away view of an inventive Dual Rim 123, according to a fifth embodiment of the invention. The dual rim 123, comprises of at least two separate rims that are joined to form a single vehicle rim 10, such as, for example, by using an inner rim or first rim 120, and an outer rim or second rim or face plate or logo plate 130. The first rim 120, has an inner rim outer surface 13, a first section 111, a second section 112, a first rim inner wall 114A, and a first rim outer wall 114B. The first rim inner wall 114A, has an inner or first rim mini-wall or mini-rim 115, having a plurality of holes or openings 117, and the first rim outer wall 114B, has an inner rim bead or lip 113B, along the outer peripheral edge of the first rim outer wall 114B. The second rim 130, has an outer rim surface 136, an outer rim bead or lip 113A, a section 131, an outer rim outer surface 13C, second rim outer wall 134A, and a second rim inner wall 134B. The second rim inner wall 134B, has an outer or second rim mini-wall or mini-rim 135, having a plurality of holes or openings 137, and the second rim outer wall 134A, has an outer rim bead 113A, along the outer peripheral edge of the second rim outer wall 134A. The second or outer rim 130, also has a valve stem 139, which is used to inflate or deflate a tire 100. It should be appreciated that the peripheral surfaces of the outer rim outer surface 13C, is substantially on the same plane as the peripheral surface of the inner rim outer surface 13, especially after the two rim pieces 120, 130, are mated or secured each with the other. The second or the outer rim 130, also has a central opening 20, and, optionally, at least one plug 22, or logo plug 22, could be secured over or into the central opening 20, to cover or protect the central opening 20, or to provide continuity to a logo 25, 125. Prior to using the dual rim 123, the first rim or inner rim 120, would be mated with the second rim or outer rim 130, such that the holes or openings 117, in the inner rim mini-wall 115, are aligned with the holes or openings 137, in the outer rim mini-wall 135, and then a securing means 138, is used to secure the first rim 120, to the second rim 130, such that the two rims 120, 130, now act as a single vehicle rim 10. The at least one securing means 138, could be selected from a group consisting of, for example, a bolt 138, a threaded bolt 138, a screw 138, a weld 138, and combinations thereof, to name a few. For some applications one could also have at least one gasket 150, or spacer 150, having a first surface or face 150A, a second surface or face 150B, and a peripheral outer surface 13G, and wherein the gasket 150, would be securely placed between the peripheral edges of the inner rim 120, and the outer rim 130, or between the first mini-rim 115, and the second mini-rim 135, so as to prevent any air leakage between the mated surfaces of the first rim 120, and the second rim 130. It is preferred that outer surfaces 13, 13G, and 13C, are substantially on the same plane, each with the other. The material for the at least one gasket 150, could be selected from a group comprising of a metallic material, an alloy material, a chrome material, a stainless steel material, a magnesium material, an aluminum material, an alloy of magnesium and aluminum, a gold-plated material, a silver-plated material, a composite material, a material having at least one coating of PTFE, a rubber material, a plastic material, a PTFE material, and combinations thereof, to name a few. For some applications the securing means 138, could be secured to a second securing means 118, such as, for example, securing means 138, could be a threaded bolt 138, having external threads 138A, and which could be secured to a threaded nut 118. Similarly, it should be appreciated that the holes 117, 137, could have internal threads 117A, 137A, to accommodate and be secured by a securing means 138, having external threads 138A.

Figure 6:
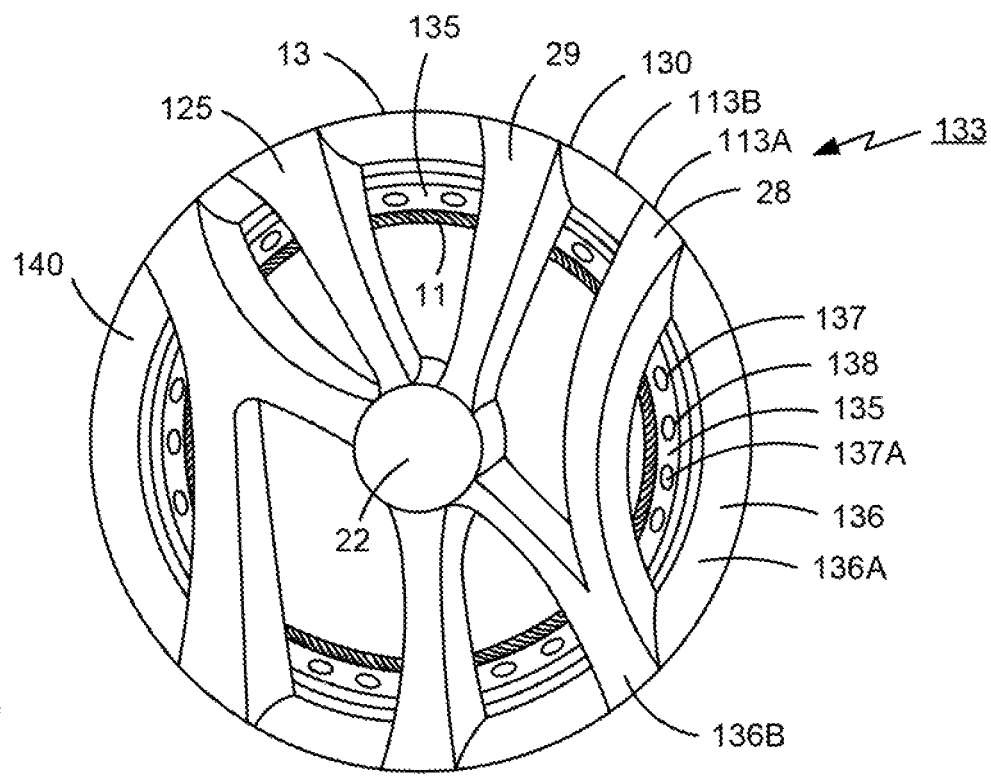
FIG. 6, illustrates a front perspective view of an inventive Dual Rim with Logo, according to a sixth embodiment of the invention.

FIG. 6, illustrates a front perspective view of an inventive Dual Rim with Logo 133, according to a sixth embodiment of the invention. The dual rim with logo 133, has an outer rim wall surface 136, and at least one logo 125, along the outer rim wall surface 136. As one can appreciate that for some applications the logo 125, could be integrated into the outer rim or face plate or logo plate 130, and be a part of the outer rim 130, as a single unit, however, for some applications the at least one logo 125, could be secured to the outer rim 130, using the unused holes or openings 137, and then the leftover holes or opening 137, in the outer rim mini-wall 135, would be used to secure the outer rim mini-wall 135, to the inner rim mini-wall 115, using securing means 138, via the holes or openings 137, 117. It should be appreciated that the holes or openings 117, in the inner rim mini-wall 115, would be behind the logo 125, and thus would be covered or protected by the outer rim wall surface 136, or the logo surface 136. For some applications the logo 125, could have an outer rim first surface 136A, and an outer rim second surface 136B, such that the plane of the first surface 136A, would be different than the plane of the second surface 136B, so as to create a 3-D effect or provide a depth to the logo 125. It should be appreciated that with this inventive dual rim or dual logo rim the user just needs to change the outer rim 130, or just the logo 25, 125, that is secured to the outer rim 130, so for example, during baseball season the user could have a logo 25, 125, of their favorite baseball team, and then during football season the user could easy take the baseball team logo 25, 125, out and replace it with their favorite football team logo 25, 125.

Figure 7:
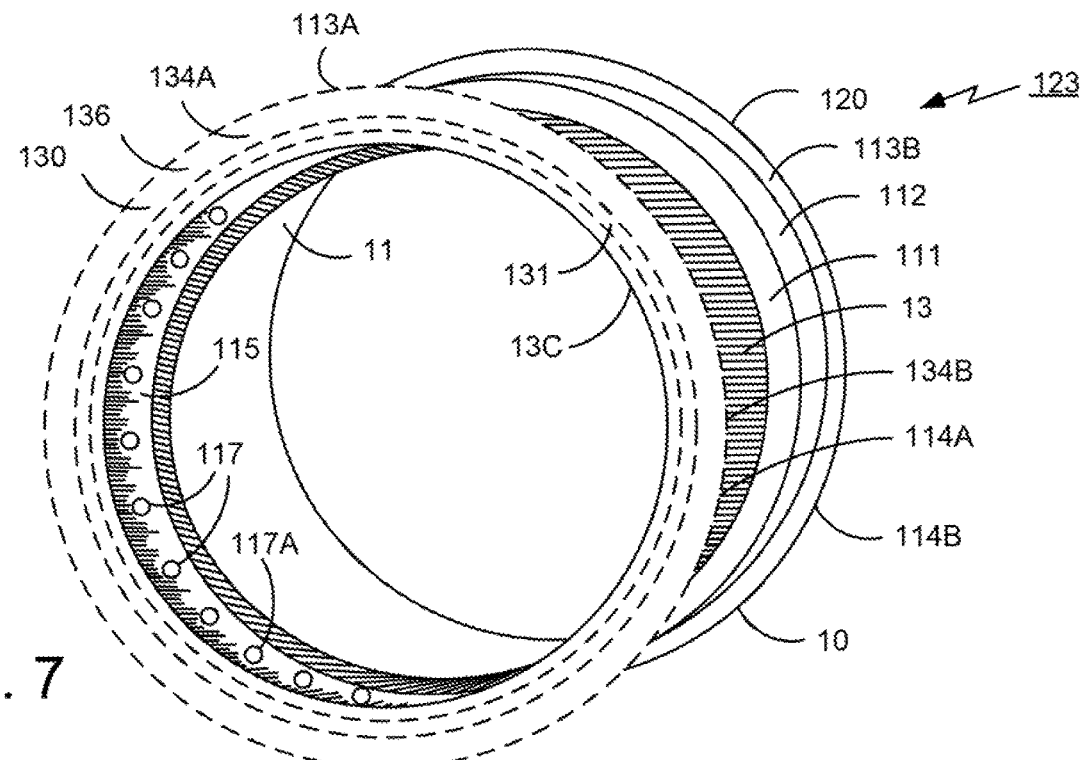
FIG. 7, illustrates a perspective cut-away view of an inventive Dual Rim, according to a seventh embodiment of the invention.

FIG. 7, illustrates a perspective cut-away view of an inventive Dual Rim, 123, according to a seventh embodiment of the invention, and illustrating the first rim or the inner rim 120, to which the second rim or the outer rim or face plate or logo plate 130, would be mated or joined to form the single vehicle rim 10. The first rim or inner rim 120, has first rim outer wall 114B, having an inner rim bead 113B, at one end, and a first rim inner wall 114A, having a peripheral first or inner mini-rim or mini-wall 115, having a plurality of holes or openings 117. The second rim or outer rim 130, has second rim outer wall 134A, having an outer rim bead 113A, at one end, and a second rim inner wall 134B, having a peripheral second or inner mini-wall or mini-rim 135, having a plurality of holes or openings 137. The holes or openings 137, serve two functions, the first is for the holes or openings 137, be used to mate the first or inner rim 120, with the second or outer rim 130, and then the non-used holes or openings 137, are then used to securely secure the logo 125, to form the dual rim 123, via the unused holes or openings 137, in the second or outer rim 130. As stated earlier that the holes 117, in the inner rim mini-wall 115, are aligned with the holes 137, in the outer rim mini-wall 135, and then a securing means 138, such as, a bolt 138, is then used to secure the first or inner rim 120, to the second or outer rim 130. For some applications several holes or openings 117, 137, may be left open or unsecured and those holes or openings 117, 137, would be available to secure the logo 125, to the outer wall surface 134A, of the outer rim or second rim 130. The first rim or inner rim 120, has an inner rim bead 113B, along the first rim outer wall 114B, while the second rim or outer rim 130, has an outer rim bead 113A, along the second rim outer wall 134A, and these two end or edge rim beads 113A, 113B, are used to hold the peripheral tire bead edges of the tire 100.

Figure 8:
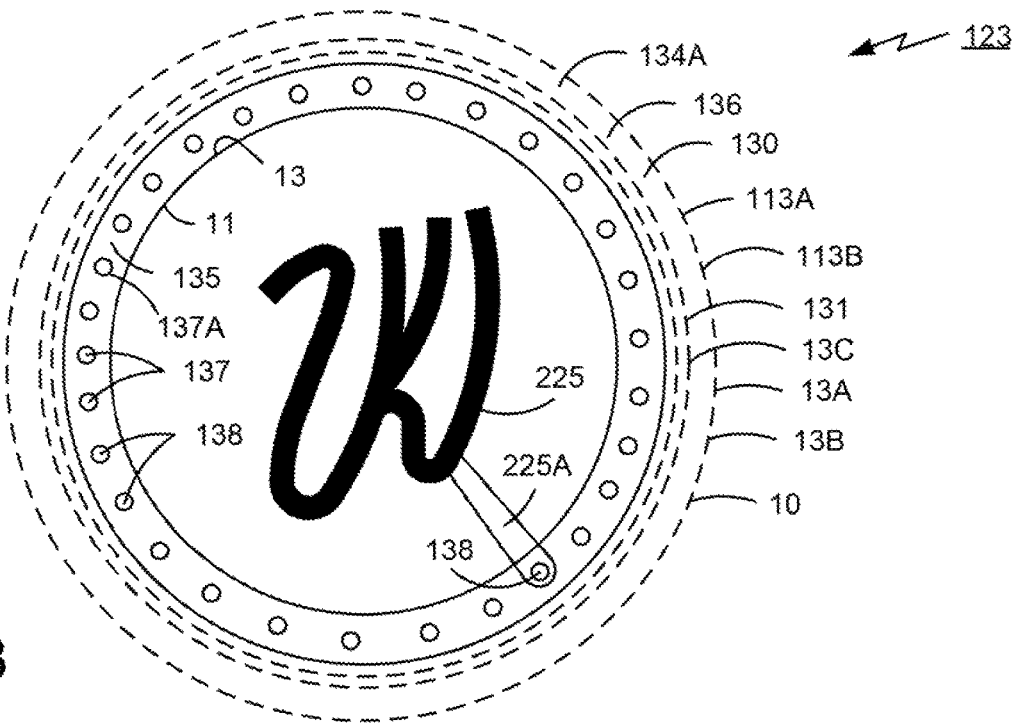
FIG. 8, illustrates a front perspective view of an inventive Dual Rim without a Logo, according to an eighth embodiment of the invention.

FIG. 8, illustrates a front perspective view of an inventive Dual Rim 123, without a Logo 25, 125, according to an eighth embodiment of the invention. The outer rim mini-rim or mini-wall 135, has a plurality of openings or holes 137, that are used to secure the second or outer rim or face plate or logo plate 130, to the first rim or the inner rim 120, using the corresponding openings or holes 117, and the unused holes or openings 137, 117, would be used to secure the logo 25, 125, to the second rim 130, using securing means 138, such as, for example, a bolt 138. FIG. 8, also shows that a personalized logo 225, can be secured to a wheel disc rim or ring 240, or an outer rim 230, to form the logo rim 223, similar to a logo 225, that is integrated into a wheel disc rim or ring 240, as more clearly shown in FIG. 9. The securing or the integration of the personalized logo 225, into a wheel disc rim 240, can be done by a number of methods, such as, forming a logo rim 223, where the logo 25, 125, is already integrated into the wheel disc rim 240, or the outer rim 230, or optionally, the personalized logo 225, could have at least one extension or connector 225A, that could be used to secure the personalized logo 225, to the wheel disc rim 240, or the outer rim 230, using, for example, at least one securing means 138.

Figure 9:
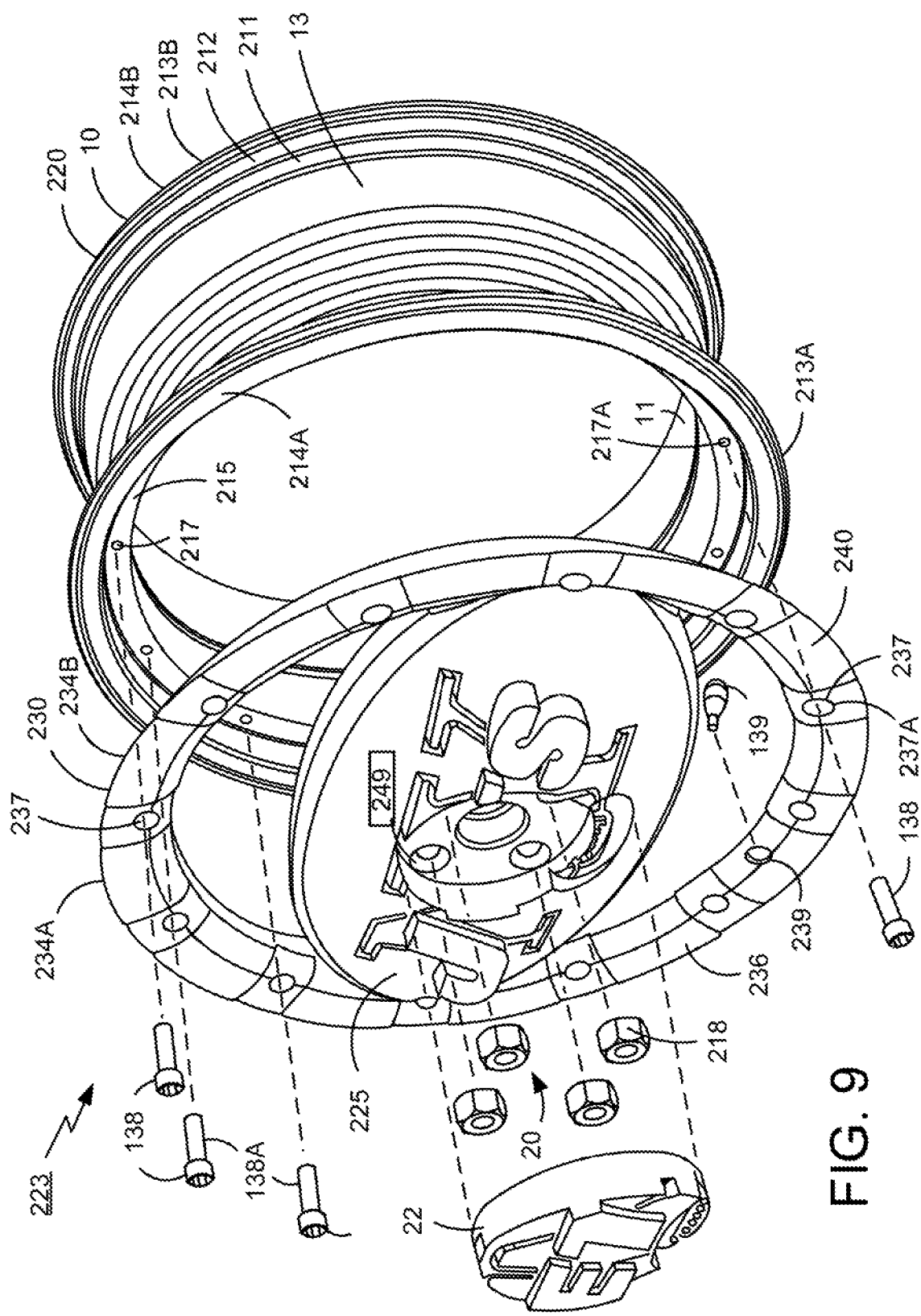
FIG. 9, illustrates a perspective view of an inventive Dual Rim with Logo, according to a ninth embodiment of the invention.

FIG. 9, illustrates a perspective view of an inventive KW Dual Rim with Logo, according to a ninth embodiment of the invention. The dual rim 223, comprises of at least two separate rims that are joined to form a single vehicle rim 10, such as, for example, by using a hollow inner rim or first rim 220, and an outer rim or second rim or face plate or logo plate 230. The first rim 220, has an inner rim inner surface 11, an inner rim outer surface 13, a first section 211, a second section 212, a first rim inner wall 214A, and a first rim outer wall 214B. The first rim outer wall 214B, has an outer rim bead or lip 213B. The first rim inner wall 214A, has an inner or first rim mini-wall or mini-rim 215, having a plurality of holes or openings 217, and the first rim inner wall 214A, has an inner rim bead or lip 213A, along the outer peripheral edge of the first rim inner wall 214A. The second rim 230, has an outer rim surface 236, a second rim outer wall 234A, and a second rim inner wall 234B. The second rim surface 236, has a plurality of holes or openings 237, along the peripheral edges, and these holes or openings 237, are aligned with or correspond with corresponding holes or openings 217, in the mini-rim 215, or mini-wall 215. The second or outer rim 230, also has a valve stem opening or hole 239, for the valve stem 139, which is used to inflate or deflate a tire 100. It should be appreciated that the peripheral surfaces of the inner hollow rim 220, are now substantially the same as a normal tire rim, so that the tire can be mounted and removed just like a normal tire currently in use in the world. Prior to using the dual rim 223, the first rim or inner rim 220, would be mated with the second rim or outer rim 230, such that the holes or openings 217, in the inner rim mini-wall 215, are aligned with the holes or openings 237, in the outer rim 230, and then a securing means 238, are used to secure the first rim 220, to the second rim 230, such that the two rims 220, 230, now act as a single vehicle rim 10. The at least one securing means 238, could be selected from a group consisting of, for example, a bolt 238, a threaded bolt 238, a screw 238, a weld 238, and combinations thereof, to name a few. The outer or second rim 230, has a plurality of lug holes or openings 249, to accommodate lug nuts 218. It should be appreciated that the outer or second rim 230, now acts a wheel disc rim or ring 240, which would now be used to secure the dual rim 223, onto a vehicle (not shown). The second or the outer rim 230, also has a central opening 20, and, optionally, at least one plug 22, or logo plug 22, could be secured over or into the central opening 20, to cover or protect the central opening 20, or to provide continuity to a logo 25, 125, 225. For some applications the securing means 138, could be secured to a second securing means 118, such as, for example, securing means 138, could be a threaded bolt 138, having external threads 138A, and which could be secured to a threaded nut 118. Similarly, it should be appreciated that the holes 217, 237, could be passthrough holes 217, 237, or the holes 217, 237, could have internal threads 217A, 237A, to accommodate, and be secured by a securing means 138, having external threads 138A. Thus, as one can see in FIG. 9, that the inner rim 220, of the vehicle rim 10, is hollow on the inside, such that it does not have any structure to support a rotor or hub 250, and that it has an outer rim bead 213A, and an inner rim bead 213B, and wherein the tire rim 10, 220, is configured for receiving a tire 100, on its peripheral external radial wall surface between a first rim bead 213A, and a second rim bead 213B, such that a first tire bead of the tire 100, is in physical contact with the first rim bead 213A, and a second tire bead of the tire 100, is in physical contact with the second rim bead 213B, and where the tire 100, can be inflated or deflated using a valve stem 139.

Figure 10:
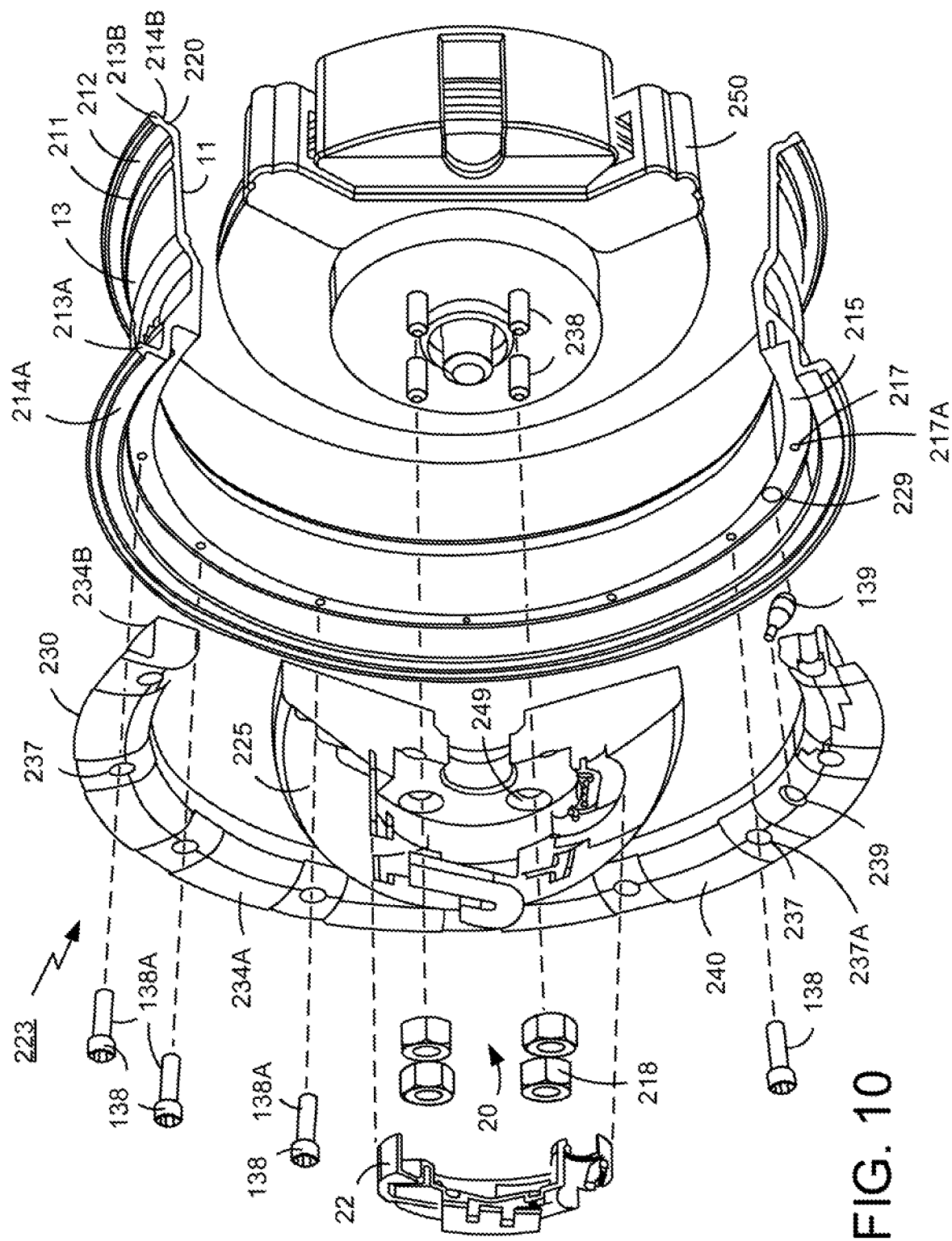
FIG. 10, illustrates a perspective cut-away view of an inventive Dual Rim with Logo, according to a tenth embodiment of the invention.

FIG. 10, illustrates a perspective cut-away view of an inventive KW Dual Rim with Logo 223, according to a tenth embodiment of the invention. The illustration in FIG. 10, is substantially similar to the features shown in FIG. 9, however, FIG. 10, shows a rotor or hub 250, having a plurality of threaded studs 238, onto with dual rim 223, would be secured to using lug nuts 218. The first or inner rim 220, also has a valve stem opening or hole 229, for the valve stem 139, which is used to inflate or deflate a tire 100. The outer or second rim or face plate or logo plate 230, has a plurality of lug holes or openings 249, for the passage of the threaded studs 238, which are secured using lug nuts 218, so that the vehicle rim 10, having the tire 100, is secured to the rotor or hub 250, of a vehicle.

It should be appreciated that the logo 25, 125, 225, now acts as a hub 75, or as a support 75, or a wheel disc rim or ring 240, for the vehicle axle via the central opening 20, to which an axle or rotor or hub 250, would be secured to as shown in FIG. 10. However, it should be understood that an axle hub 75, could also be provided to the inner rim 120, 220, outer rim 130, 230, or to both.

It is preferred that a minimum of 12 universal screw holes 117, 137, 217, 237, and say a maximum of 24 "dummy holes" may be made to be utilized for different logo-rims front plate or face plate 130, 230. It should be understood that the hollow center cap is a part of the design feature of the logo-rim 25, 125, 225. Preferably, every logo-rim 25, 125, 225, be designed with a "hollow center cap" or opening 20. As stated earlier that the logo-rims 25, 125, 225, comprise of two sections, namely, the front plate 130, 230, or face plate 130, 230, or logo plate 130, 230, which features the logos 25, 125, 225, and the tire wheel rim 10, which is designed with a minimum of 12 universal screw holes or dummy holes 117, 137, 217, 237. As one can see that the tire rim wheel 10, in the first or inner rim 120, 220, is hollow with nothing being there to support a car axle or the rotor 250, as the car axle or the rotor 250, is always supported by the front plate 130, 230, and the supporting structure of the integrated logo 25, 125, 225, using the central opening 20. As stated earlier that the tire wheel rim 120, 220, is hollow with nothing there to support a car axle or rotor or hub 250, and thus it is also universally designed to accommodate various different front plate 130, 230, or face plate 130, 230. It should be appreciated that multiple front plates 130, 230, can be made available for specific preferences, and are interchangeable. Each face plate 130, 230, must be designed with an air valve or valve stem hole or opening 239. It should be understood that the logo-rim face plate 130, 230, is not a hub cap, but a wheel disc rim 240, that supports the weight of the vehicle (not shown). And, thus when the logo-rim face plate 130, 230, is mated or secured to the inner rim 120, 220, it becomes one solid vehicle rim 10, having full structural integrity of an existing rim 10, that is currently in use in vehicles. As stated earlier that the logo-rim 25, 125, 225, has been invented to provide automobile enthusiasts with a way to connect with their favorite pastime, such as, for example, a sports team, something that is in vogue in popular culture, or customize it, or have it personalized with a logo, to name a few. The screws or bolts 138, are typically inserted from the face plate 130, 230, and into the tire wheel 120, 220, so as to form the logo rim 25, 125, 225. It should be understood that the logo-rims 25, 125, 225, have been invented so that one can customize their KW dual rims 23, 123, 223, to a recommended specifications of an automobile manufacturer, or a color scheme, to name a few.

For some applications, as shown in FIG. 4, one could also optionally have an extension or protrusion or leg 15A, of the logo outer peripheral edge 15, that would be secured to the mini-rim side wall or surface or peripheral radial side surface 11C, of the at least one internal radial mini-rim ring 10A. Thus, for some applications the logo outer peripheral edge 15, of the logo 85, would be fully or partially secured to the mini-rim side wall surface 11C, such as, for example, by welding 26. However, for some applications the at least one internal radial mini-rim ring 10A, could have at least one blind hole 10B, which would be used to accommodate the extension or protrusion or leg 15A, of the logo outer peripheral edge 15, and be secured thereto by at least one securing means 26, such as, for example, welding 26.

It should be appreciated that the at least one securing means 26, could be selected from a group comprising a weld 26, a spot weld 26, a partial weld 26, a fusing of two materials 26, a spot fuse 26, a partial fusing of two materials 26, an integration 26, of two materials to form a continuous material, a permanent integration 26, of the logo edge or mating location 27, with the rim mating location 17, to name a few.

Because of the stresses imposed by a vehicle on the rims 10, 40, 60, 80, and tires 100, of an automobile the logo 25, 45, 65, 85, 125, or logo structure 25, 45, 65, 85, 125, 225, that is contained inside the wheel rim 10, 40, 60, 80, should be able to withstand such stresses, therefore the logo rim ends or mating location 17, 27, that mate with the inner peripheral walls 11, of the rim 10, 40, 60, 80, should preferably be in the center and the securing of the same should be such that the logo 25, 45, 65, 85, 125, 225, does not move from the securing location 17, 27, or the inner peripheral walls 11, of the tire-rim 10, 40, 60, 80, does not slide away from the logo 25, 45, 65, 85, 125, that is secured thereto. For some embodiments for the protection of the logo 25, 45, 65, 85, 125, that is secured inside the tire-rim 10, 40, 60, 80, should be such that the complete logo 25, 45, 65, 85, 125, is enveloped inside the tire-rim envelope or the planar surfaces of the tire-rim outer edges 13A, 13B, such that, the logo 25, 45, 65, 85, 125, does not protrude out of the plane of the rim edges 13A, 13B, this non-protrusion would also protect the logo edges or the logo surfaces from being chipped or damaged by the debris that might be generated by the rotation of the tires 100.

The logo 25, 45, 65, 85, 125, 225, or logo structure 25, 45, 65, 85, 125, 225, that is contained inside the inner peripheral wall or rim 11, or peripheral internal radial surface 11, can be selected from a group comprising an alphabet, an initial, a number, a team name, a team logo, a slogan, a phrase, a scenery, an artistic feature, an animal depiction, and combinations thereof, to name a few.

The material for the vehicle rim 10, 40, 60, 80, and/or the logo 25, 45, 65, 85, 125, 225, or logo structure 25, 45, 65, 85, 125, 225, is selected from a group comprising a metallic material, an alloy material, a chrome material, a stainless steel material, a magnesium material, an aluminum material, an alloy of magnesium and aluminum, a gold-plated material, a silver-plated material, a composite material, a material having at least one coating of Teflon (polytetrafluoroethylene) (PTFE), and combinations thereof, to name a few.

The at least one securing means 26, 138, 238, is selected from a group comprising, a weld, a screw means, a nut and bolt means, a tongue and groove means, and combinations thereof, to name a few.

It should also be appreciated and understood that the vehicle rim 10, 40, 60, 80, and the logo 25, 45, 65, 85, 125, 225, or logo structure 25, 45, 65, 85, 125, 225, could be made as a one-piece structure or unit, such as, by injection molding or casting, which methods are well understood and established in the art, or similar other means, which are well-known, and such techniques and methods are incorporated herein by reference. Injection molding can be performed with a host of materials, including metals, (for which the process is also called die-casting). Material for the part is fed into a heated barrel, mixed, and forced into a mold cavity, where it cools and hardens to the configuration of the cavity. After a product is designed, molds are made by a mold-maker, or toolmaker, from metal, usually either steel or aluminum, and precision-machined to form the features of the desired part. Injection molding is widely used for manufacturing a variety of parts. However, advances in 3D printing technology also would allow the production of the vehicle rim 10, 40, 60, 80, and the logo 25, 45, 65, 85, 125, 225, or logo structure 25, 45, 65, 85, 125, 225, being made as a one-piece structure or unit, and such 3D printing techniques are incorporated herein by reference.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An inventive rim for an automotive vehicle, comprising:
   (a) a first rim having an outer wall at one end and a first mini-rim at an opposite end, and wherein said outer wall has a first rim head, and said first mini-rim has a plurality of first holes along a peripheral wall surface;
   (b) a second rim having an outer wall at one end and a second mini-rim at an opposite end, wherein said outer wall has a second rim bead, and said second mini-rim has a plurality of second holes along a peripheral wall surface;
   (c) wherein said first rim is secured to said second rim by aligning at least one first hole of said first mini-rim with a corresponding second hole in said second mini-rim, and securing said first mini-rim to said second mini-rim using at least one first securing means, and forming a tire rim; and
   (d) wherein said tire rim being configured for receiving a tire on its peripheral external radial wall surface between said first rim bead and said second rim bead, wherein a first tire bead is in physical contact with said first rim head, and a second tire bead is in physical contact with said second rim bead.

2. The inventive rim for an automotive vehicle of claim 1, wherein at least one support structure is secured to said tire rim using at least one second securing means, and wherein said second securing means is secured to one of said first hole and said second hole.

3. The inventive rim for an automotive vehicle of claim 1, wherein at least one support structure is secured to said tire rim using at least one second securing means, and wherein said second securing means is secured to one of said first hole and said second hole, and wherein said at least one support structure is secured to said tire rim at at least two different locations.

4. The inventive rim for an automotive vehicle of claim 1, Wherein at least one support structure is secured to said tire rim using at least one second securing means, and wherein said second securing means is secured to one of said first hole and said second hole, and wherein said at least one support structure is configured to represent at least one logo.

5. The inventive rim for an automotive vehicle of claim 1, wherein a tire rim hub is integrated into and is a part of said at least one logo.

6. The inventive rim for an automotive vehicle of claim 5, wherein at least one logo plug slideably and engageably covers a central opening in said at least one logo.

7. The inventive rim for an automotive vehicle of claim 4, wherein at least one logo plug slideably and engageably covers a central opening in said at least one logo, and at least one securing means secures said at least one logo plug to said at least one logo.

8. The inventive rim for an automotive vehicle of claim 1, wherein said at least one first securing means is selected from a group consisting of a screw means, a bolt means, a threaded bolt means, a nut and bolt means, a tongue and groove means, a weld, and combinations thereof.

9. The inventive rim for an automotive vehicle of claim 1, wherein at least one support structure is secured to said tire rim using at least one second securing means, and wherein said at least one support structure is selected from a group consisting of an alphabet, an initial, a number, a team name, a team logo, a slogan, a phrase, a scenery, an artistic feature, an animal depiction, and combinations thereof.

10. The inventive rim for an automotive vehicle of claim 1, wherein at least one support structure is secured to said tire rim using at least one second securing means, and wherein material for said at least one support structure is selected from a group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of polytetrafluoroethylene, and combinations thereof.

11. The inventive rim for an automotive vehicle of claim 1, wherein material for said first rim, and said second rim, is selected from a group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of polytetrafluoroethylene, and combinations thereof.

12. The inventive rim for an automotive vehicle of claim 1, wherein said first rim has a central opening for mounting to an axle of an automotive vehicle via a wheel hub.

13. The inventive rim for an automotive vehicle of claim 1, wherein said second rim has a central opening for mounting to an axle of an automotive vehicle via a wheel hub.

14. The inventive rim for an automotive vehicle of claim 1, wherein at least one gasket is securely placed between said first rim, and said second rim.

15. The inventive rim for an automotive vehicle of claim 1, wherein at least one gasket is securely placed between said first rim, and said second rim, and wherein material for said at least one gasket is selected from a group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of polytetrafluoroethylene, a rubber material, a plastic material, a polytetrafluoroethylene material, and combinations thereof.

16. The inventive rim for an automotive vehicle of claim 1, wherein at least one gasket is securely placed between said first mini-rim, and said second mini-rim.

17. The inventive rim for an automotive vehicle of claim 1, wherein at least one gasket is securely placed between said first mini-rim, and said second mini-rim, and wherein material for said at least one gasket is selected from a group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of polytetrafluoroethylene, a rubber material, a plastic material, a polytetrafluoroethylene material, and combinations thereof.

18. An inventive rim for an automotive vehicle, comprising:
(a) a first rim having an outer wall at a first end, and an inner wall at a second end, said outer wall having an outer rim bead projecting substantially in an outwardly direction, said inner wall having an inner rim bead projecting substantially in an outwardly direction, said inner wall having a mini-rim projecting substantially in an inward direction, and wherein said mini-rim has a plurality of first holes along a peripheral inner wall surface;
(b) a second rim having an outer wall, and in inner wall, and a plurality of second holes along a peripheral wall surface;
(c) wherein said first rim is secured to said second rim by aligning at least one first hole of said mini-rim with a corresponding second hole in said second rim, and securing said mini-rim to said second rim using at least one first securing means, and forming a tire rim; and
(d) wherein said tire rim being configured for receiving a tire on its peripheral external radial wall surface between said first rim bead, and said second rim bead, wherein a first tire bead is in physical contact with said first rim bead, and a second tire bead is in physical contact with said second rim bead.

19. An inventive rim for an automotive vehicle, comprising:
(a) a first rim having an outer wall at one end and a first mini-rim at an opposite end, and wherein said outer wall has a first rim bead, and said first mini-rim has a plurality of first holes along a peripheral wall surface, and said first rim having a central opening for mounting to an axle of an automotive vehicle via a wheel hub;
(b) a second rim having an outer wall at one end and a second mini-rim at an opposite end, wherein said outer wall has a second rim bead, and said second mini-rim has a plurality of second holes along a peripheral wall surface, and said second rim having a central opening for mounting to an axle of an automotive vehicle via a wheel hub;
(c) wherein said first rim is secured to said second rim by aligning at least one first hole of said first mini-rim with a corresponding second hole in said second mini-rim, and securing said first mini-rim to said second mini-rim using at least one first securing means, and forming a tire rim;
(d) wherein said tire rim being configured for receiving a tire on its peripheral external radial wall surface between said first rim bead and said second rim bead, wherein a first tire bead is in physical contact with said first rim bead, and a second tire bead is in physical contact with said second rim bead; and
(e) at least one support structure secured to said tire rim using at least one second securing means, and wherein said second securing means is secured to said second hole of said second mini-rim, and wherein said at least one support structure is secured to said tire rim at at least two different locations, and wherein said at least one support structure is at least one logo.

20. The inventive rim for an automotive vehicle of claim 19, wherein at least one gasket is securely placed between said first rim, and said second rim.

* * * * *